US009192270B2

(12) United States Patent
Westbrook et al.

(10) Patent No.: US 9,192,270 B2
(45) Date of Patent: Nov. 24, 2015

(54) DRAIN SYSTEM AND METHOD FOR VACUUM CLEANER

(71) Applicant: SHOP VAC CORPORATION, Williamsport, PA (US)

(72) Inventors: Kurt Westbrook, Cogan Station, PA (US); Seth A. Bartley, Williamsport, PA (US); David Martinez, Williamsport, PA (US); Zachary A. Shultz, Milton, PA (US)

(73) Assignee: SHOP VAC CORPORATION, Williamsport, PA (US)

( * ) Notice: Subject to any disclaimer, the term of this patent is extended or adjusted under 35 U.S.C. 154(b) by 62 days.

(21) Appl. No.: 14/025,401

(22) Filed: Sep. 12, 2013

(65) Prior Publication Data

US 2015/0067978 A1 Mar. 12, 2015

(51) Int. Cl.
*A47L 7/00* (2006.01)
*A47L 5/36* (2006.01)
*A47L 11/40* (2006.01)
*B65D 47/20* (2006.01)
*F16L 55/115* (2006.01)

(52) U.S. Cl.
CPC .............. *A47L 7/0038* (2013.01); *A47L 5/365* (2013.01); *A47L 11/4025* (2013.01); *B65D 47/205* (2013.01); *F16L 55/1152* (2013.01); *Y10T 137/0318* (2015.04)

(58) Field of Classification Search
CPC ....... A47L 7/0038; A47L 5/365; A47L 5/362; A47L 9/242; A47L 9/2842
See application file for complete search history.

(56) References Cited

U.S. PATENT DOCUMENTS

| 2,772,037 | A | | 11/1956 | Rieke | |
|---|---|---|---|---|---|
| 3,496,146 | A | | 2/1970 | Conners et al. | |
| 4,133,347 | A | * | 1/1979 | Mercer | 137/240 |
| 4,223,702 | A | * | 9/1980 | Cook | 138/106 |
| 4,231,595 | A | * | 11/1980 | Knutsen | 285/38 |
| 4,799,699 | A | | 1/1989 | Berfield et al. | |
| 4,801,376 | A | | 1/1989 | Kulitz | |
| 4,854,349 | A | * | 8/1989 | Foreman | 138/89 |
| 4,858,269 | A | | 8/1989 | Ostroski et al. | |
| 5,023,959 | A | * | 6/1991 | Mercer | 4/321 |
| 5,244,003 | A | * | 9/1993 | Boomgaarden | 137/1 |
| 5,263,223 | A | | 11/1993 | Fiegel et al. | |
| 5,385,233 | A | | 1/1995 | McKibben et al. | |
| 5,417,460 | A | * | 5/1995 | Lunder | 285/253 |

(Continued)

FOREIGN PATENT DOCUMENTS

DE 29910800 U1 11/2000
EP 1190661 A2 3/2002

OTHER PUBLICATIONS

Extended European Search Report, European Patent Application No. 14175737.7, dated Jul. 7, 2015.

*Primary Examiner* — Dung Van Nguyen
(74) *Attorney, Agent, or Firm* — Marshall, Gerstein & Borun LLP (57) ABSTRACT

A vacuum cleaner comprising a tank for collecting material having a base, an outside surface and an opening disposed at the base. A drain system is disposed adjacent the opening and includes a drain tube having an outlet and a cap mounted to the drain tube and removably secured to prevent material from exiting the drain system. When the cap is removed, the drain tube slides out of the opening in a first direction and the outlet permits material to leave the drain tube in a direction other than the first direction.

20 Claims, 10 Drawing Sheets

(56) References Cited

U.S. PATENT DOCUMENTS

| | | |
|---|---|---|
| 5,526,547 A | 6/1996 | Williams et al. |
| 5,954,863 A | 9/1999 | Loveless et al. |
| 6,219,880 B1 | 4/2001 | Worden et al. |
| 6,237,187 B1 | 5/2001 | Hult et al. |
| 6,347,429 B1 | 2/2002 | Hult et al. |
| 6,363,574 B2 | 4/2002 | Worden et al. |
| 6,451,078 B2 | 9/2002 | Berfield et al. |
| 7,203,994 B2 | 4/2007 | Smith |
| 7,299,522 B1 | 11/2007 | Smith |
| 7,363,679 B2 | 4/2008 | Zimmerle et al. |
| 7,653,963 B2 | 2/2010 | Cochran et al. |
| 7,779,505 B2 | 8/2010 | Krebs et al. |
| 7,988,162 B2 | 8/2011 | Sands |
| 8,075,650 B2 | 12/2011 | Hale |
| 8,313,396 B1 | 11/2012 | Mailman |
| 8,375,506 B2 | 2/2013 | Chaney |
| 8,997,308 B2 * | 4/2015 | Cortes Ruiz et al. .......... 15/347 |

\* cited by examiner

DRAIN SYSTEM AND METHOD FOR VACUUM CLEANER

FIELD OF THE DISCLOSURE

The present disclosure relates generally to vacuum cleaners and, more specifically, to a drain system for a wet/dry vacuum.

BACKGROUND OF THE DISCLOSURE

In certain types of vacuum cleaners, known as wet/dry vacuum cleaners, debris or material gathered by the vacuum may be wet and/or dry. In wet applications, a bag is not installed in the vacuum cleaner, but rather the material is drawn and deposited into a tank of the vacuum cleaner. The tank can be filled, and, when desired, emptied by a number of mechanisms. Such mechanisms include: (1) a drain or valve provided in an opening at a base of the tank; (2) removal of a lid and physical tilting of the tank to empty its contents; and (3) use of a pumping unit to expel the gathered liquid.

Each of these mechanisms for emptying the tank has drawbacks, however. For example, removing a lid and physically tilting a tank to empty its contents often requires a large force to tilt the full tank and an uncontrolled disposal of the contents of the tank. Using a pumping unit to expel the gathered liquid and/or debris or material requires more expensive equipment and typically more time to attach and detach the unit, for example, often resulting in a less economical option.

Simple drains at the bottom of the tank, while more economical and desirable for some applications, also include drawbacks. Such drains are typically attached to an opening near a base of the tank of the wet/dry vacuum and include a cap such that when it is desired to empty a full tank, the cap is first removed. Upon removal of the cap, however, debris or material in the full or even semi-full tank immediately routes to the opening in the base of the tank, typically causing material to rapidly spill out of the opening in an uncontrolled manner. In other words, basic drain systems of conventional wet/dry vacuums have the problem of uncontrolled material being immediately and instantaneously expelled from the tank upon removal of the cap, resulting in material being scattered about in many directions. More specifically, the material may not be directed to one area, but instead may evacuate from the tank in a rapid and messy manner, often unintentionally spilling onto areas and objects near the tank.

SUMMARY OF THE DISCLOSURE

A vacuum cleaner comprising a tank for collecting material having a base, an outside surface and an opening disposed near the base is disclosed. The vacuum cleaner further comprises a drain system disposed adjacent the opening and including a drain tube having an outlet and a cap mounted to the drain tube and removably secured to prevent material from exiting the drain system. When the cap is removed, the drain tube slides out of the opening in a first direction, and the outlet permits material to leave the drain tube in a direction other than the first direction.

In another example, a drain system for a wet/dry vacuum comprises a drain tube having an outlet and a cap mounted to the drain tube and removably secured to prevent material from exiting the drain tube. Upon removal of the cap, the drain tube slides out of the opening in a first direction, and the outlet permits material to leave the drain tube in a direction other than a first direction.

In yet another example, a method of draining a tank of a wet/dry vacuum comprises mounting a cap to a drain tube, the drain tube having an outlet, inserting the drain tube into an opening disposed near a base of a wet/dry vacuum tank, and removably securing the cap to the to prevent material from exiting the drain tube. The method further comprises removing the cap from a fully closed position toward a fully open position, allowing the drain tube to slide out of the opening in a first direction, and permitting material to leave the drain tube via the outlet in a direction other than the first direction.

BRIEF DESCRIPTION OF THE SEVERAL VIEWS OF THE DRAWINGS

FIG. 10b is a close-up view of a portion D of the cross-sectional view of FIG. 10a.

DETAILED DESCRIPTION OF THE DISCLOSURE

Figure 1:
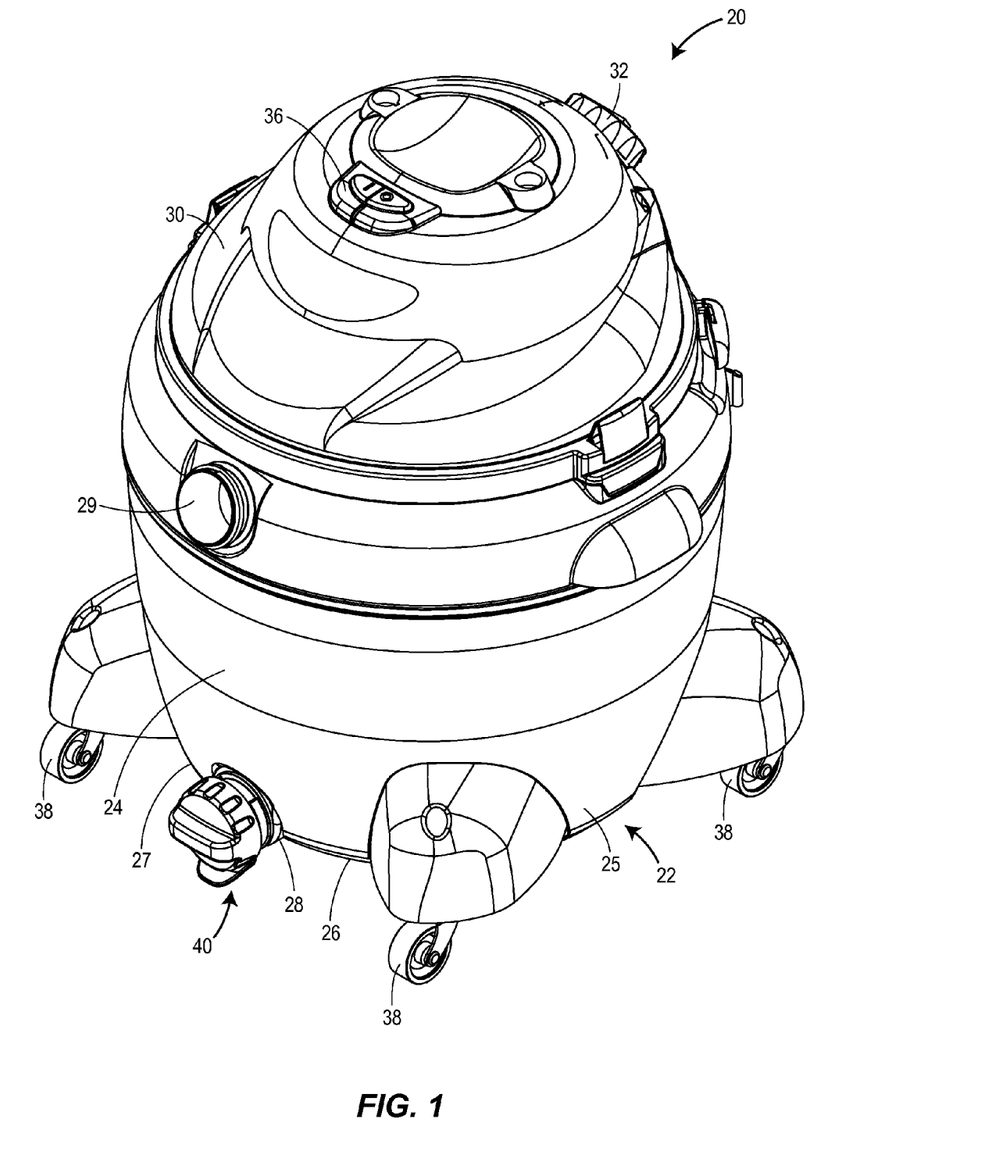
FIG. 1 is a front perspective view of a vacuum cleaner with a drain system of the present disclosure, the drain system in a closed position.
Figure 2:
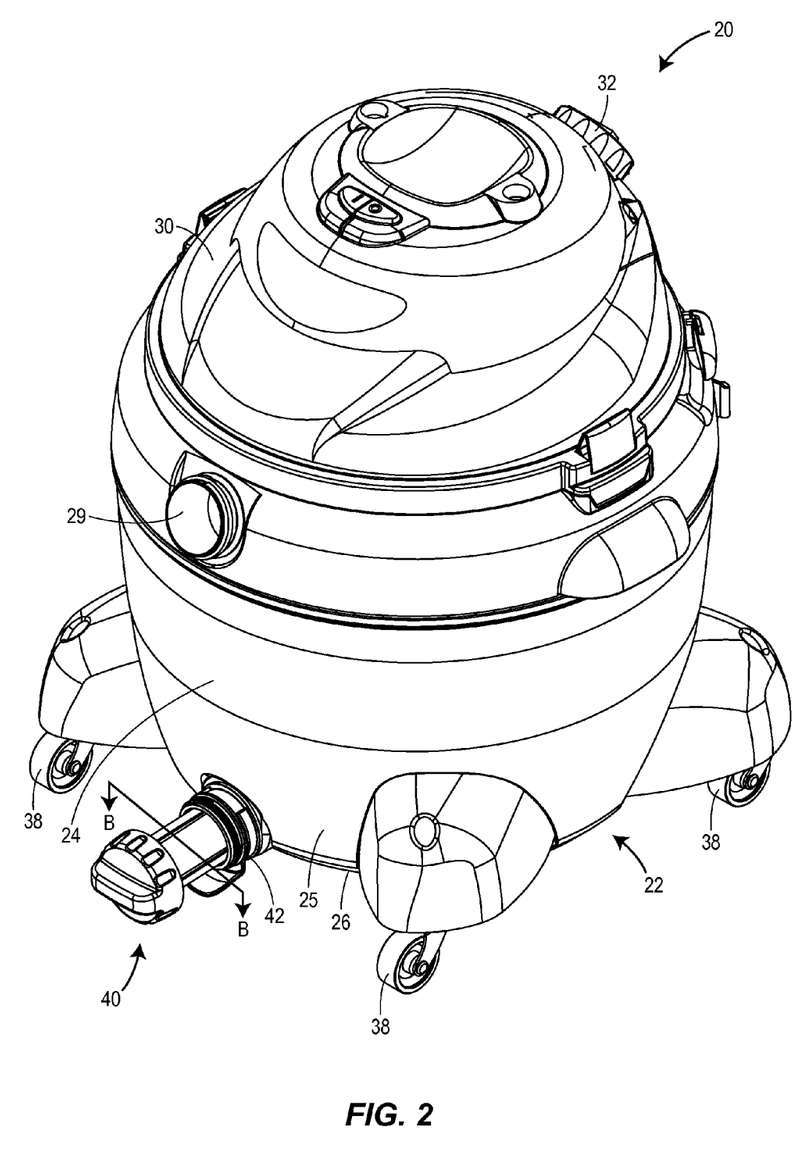
FIG. 2 is another front perspective view of the vacuum cleaner with the drain system of the present closure, the drain system in an open position.
Figure 3:
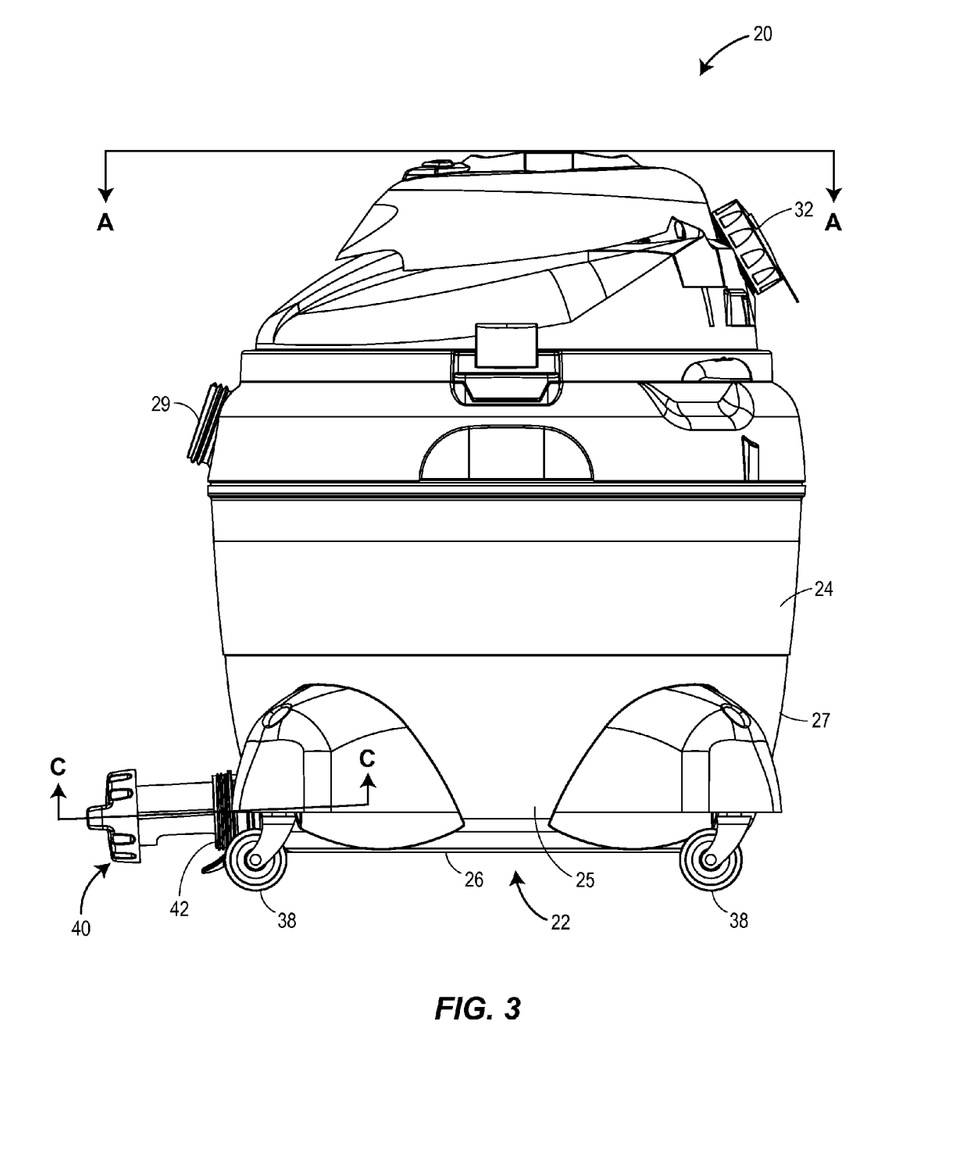
FIG. 3 is a side view of the vacuum cleaner with the drain system of the present disclosure, the drain system in an open position.

Referring now to FIGS. 1-3, a vacuum cleaner 20 constructed in accordance with the teachings of the disclosure is generally depicted. The vacuum cleaner 20 includes a tank 22 having a sidewall 24, a base 25 and a closed bottom 26. The tank 22 further includes an outside surface 27 and an opening 28 disposed at the base 25. The sidewall 24 includes an inlet 29 that is adapted to receive a hose (not shown). The tank 22 is enclosed by a removable lid 30 that includes an outlet 32, which is adapted to receive a hose (not shown) like the inlet 28, enabling the hose to be used in both a vacuuming and a blowing capacity. The lid 30 houses a motor/impeller unit 34 (FIG. 4), which can be energized upon actuation of a switch 36. A plurality of casters 38 or other wheels may be attached to the tank 22 to facilitate movement of the vacuum cleaner 20 about a worksite, for example.

In the present example, the tank 22 is generally cylindrical, the lid 30 is correspondingly shaped, and both are manufactured from molded plastic. One of skill in the art will also appreciate that the tank 22 and lid 30 may be alternatively shaped and manufactured from other materials and processes and still fall within the scope of the present disclosure.

A drain system 40 according to the present disclosure is further disposed in the opening 28 of the base 25, as described in greater detail below. In FIG. 1, the drain system 40 is depicted in a closed position, and in FIGS. 2 and 3, the drain system 40 is depicted in an open position, both of which are also described in more detail below.

Figure 4:
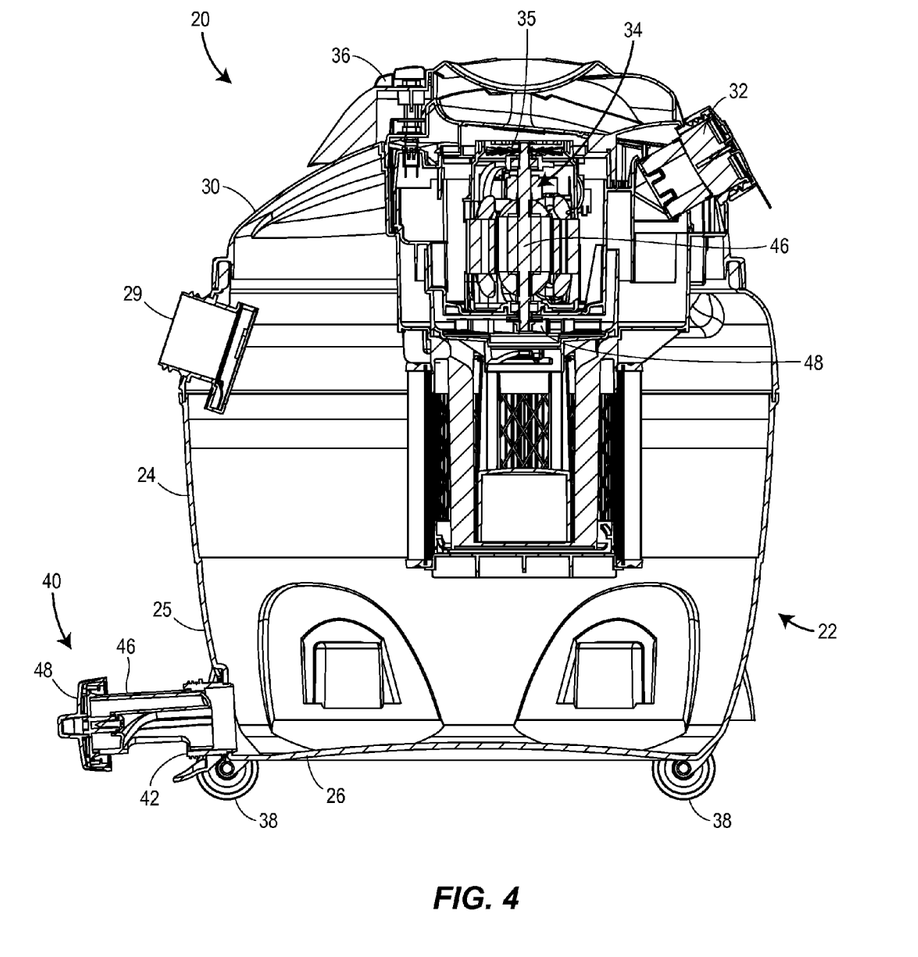
FIG. 4 is a side-cross sectional view of the vacuum cleaner with the drain system of the present disclosure taken along the lines A-A of FIG. 3.

Referring now to FIG. 4, a cross-sectional view of the vacuum cleaner 20 taken along the line A-A of FIG. 3 is depicted. The motor/impeller unit 34 includes a motor 35 from which a rotatable shaft 46 extends. A vacuum impeller 48 is mounted to the shaft 46 for rotation within a vacuum chamber for generation of a low pressure area within the tank 22 for vacuuming purposes. The vacuum cleaner 20 can be used to vacuum wet materials, in which case a bag is not used within the tank 22, and wet material gathered by the vacuum cleaner 20 is deposited directly within the tank 22.

Still referring to FIG. 4, the drain system 40 is disposed within or adjacent to the opening 28 of the base 25. The drain system 40 includes a drain tube 46 and a cap 48 rotatably mounted to the drain tube 46, as explained in more detail below. The drain system 40 may also include a drain fitting 42 disposed within the opening 28 of the tank 22 and secured to the tank 22.

Figure 5:
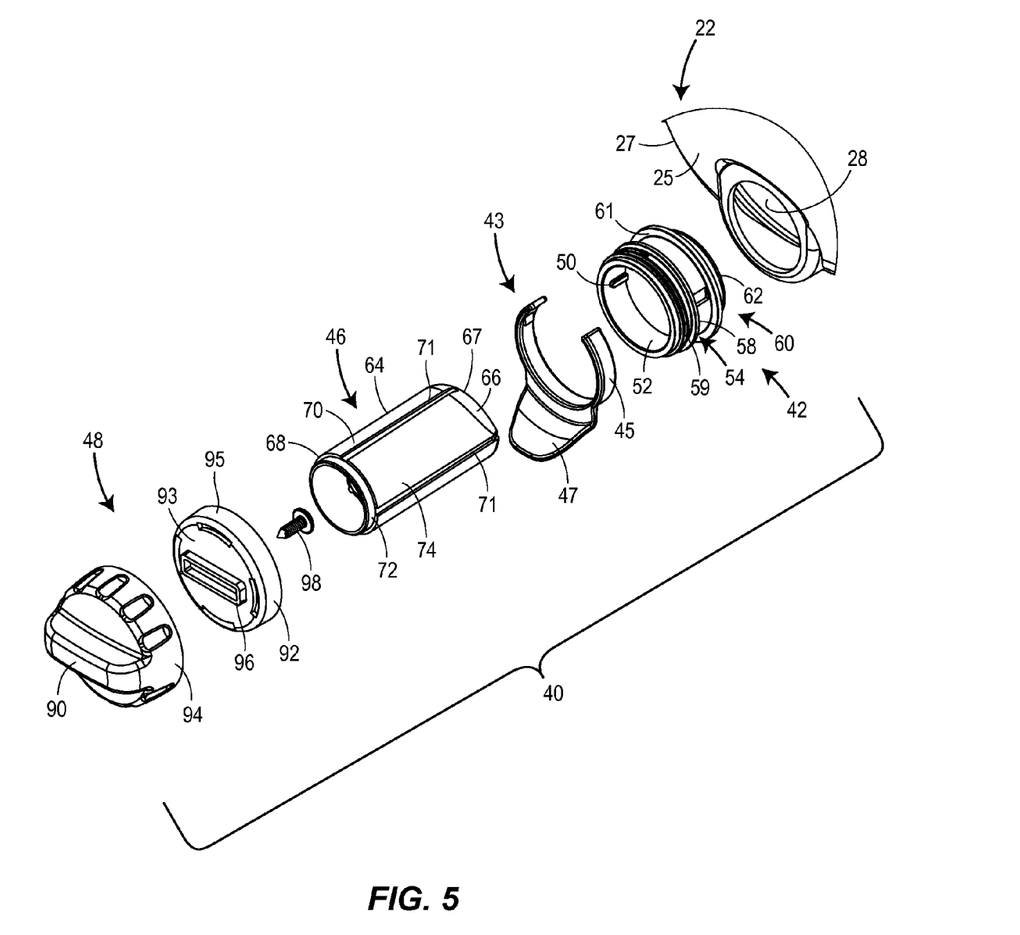
FIG. 5 is an exploded, perspective view of the drain system of the present disclosure.
Figure 6:
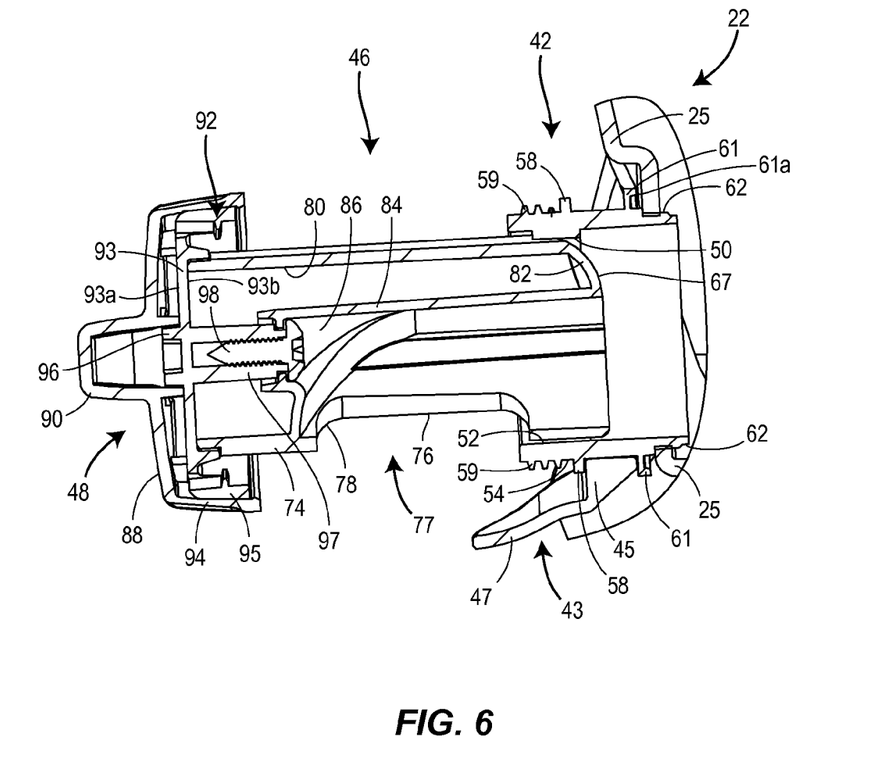
FIG. 6 is an enlarged view of the drain system of FIG. 4, the drain system in an open position.

Referring now to FIGS. 5 and 6, an exploded view and a detailed cross-sectional view, respectively, of the drain system 40 with the drain fitting 42 disposed within the opening 28 of the base 25 of the tank 22 is depicted. As illustrated therein, the drain fitting 42 further includes an inside surface 52 and an outside surface 54, and at least one drive rib 50 is disposed on the inside surface 52. The outside surface 54 includes a cylindrical portion having a first flange 58 extending radially therefrom and a threaded portion 59.

The drain fitting 42 further includes a rear portion 60 having a second flange 61 at one end and a threaded portion 62 disposed at an opposite end. The threaded portion 62 of the rear portion 60 of the drain fitting 42 is disposed within the opening 28 of the tank 22 and a shoulder surface 61a (FIG. 6) of the second flange 61 helps secure the drain fitting 42 to the tank 22, such as by spinwelding, an adhesive or other attachment means.

The drain system 40 further includes a collar 43 having a cylindrical side wall 45 and a projection member or foot 47 extending from the side wall 45 in a downward direction. The collar 43 is disposed between the first and second flanges 59 and 61 of the drain fitting 42, such that the projecting member or foot 47 may hold or direct material leaving the drain system and may prevent the vacuum tank 22 from tipping during operation of the drain system 40. More specifically, as the drain tube 46 of the drain system 40 is moved out of the opening 28 of the tank 22 and material is released, depending on the weight of the material being released, for example, the tank 22 may begin to tip over. In this case, even a slight tipping motion of the tank 22 will be stopped by the projecting member or foot 47, as it will contact the ground or other surface onto which the tank 22 is disposed. Such contact will create force on the tank 22 in a direction opposite the force causing the tank 22 to slightly tip over, placing the tank 22 back into a balanced position and preventing any further tipping.

As further illustrated in FIG. 5, the drain tube 46 of the drain system 40 includes a cylindrical body 64, a first end 66 and a second end 68 forming a pair of ends, and an exterior surface 70 extending along the length of the cylindrical body 64 between the ends 66 and 68. The exterior surface 70 further includes at least one groove 71 that is also disposed along the length of the cylindrical body 64. The groove 71 is adapted to receive the at least one drive rib 50 of the drain fitting 42 to prevent rotation of the drain tube during movement, as explained in more detail below. In addition, the cap 48 is adapted to be rotatably mounted to the drain tube 46 at the second end 68 and the drain fitting 42 is disposed near the first end 66 of the drain tube 46.

The first end 66 of the drain tube 46 further includes a spherical radius 67, as illustrated in FIGS. 5 and 6, for example. The spherical radius 67 on the first end 66 of the drain tube 46 inhibits a collection bag (not shown) in some examples of the vacuum cleaner 20 from rupturing while the vacuum cleaner 20 is in use. More specifically, when the vacuum cleaner 20 is on, the collection bag expands and contacts the spherical radius 67, which inhibits the bag from being damaged or ripped open, for example.

A rim 72 is disposed on the second end 68 of the drain tube 46. In addition, the drain tube 46 further includes a main diameter portion 74 disposed near the rim 72 and a reduced diameter portion 76 (FIG. 6) disposed near the other end or the first end 66 of the drain tube 46. An outlet 77 having a slope or an angled step 78 is disposed between the main diameter portion 74 and the reduced diameter portion 76, as illustrated in FIG. 6. Upon removal of the cap 48 from the drain fitting 42 and/or the opening 28, the drain tube 46 begins to slide out of the drain fitting 42 or the opening 28 in a first direction, axially, without any rotation. The outlet 77 permits material, such as one or more of any liquid or other wet matter or material, to leave the drain tube 46 in a direction other than the first direction. In one example, the direction other than the first direction is a generally downward direction.

As illustrated in FIG. 6, the drain tube 46 further comprises an interior surface 80 having a flange 82 radially extending therefrom. A channel 84 extends from the flange 82 and is disposed in a central area 86 of the drain tube 46. The channel 84 is adapted to receive a portion of the cap 48 of the drain system 40 to help mount the cap 48 to the drain tube 46, as explained in more detail below.

As further illustrated in FIG. 6, the cap 48 includes an exterior surface 88 having a grip 90 extending therefrom. The grip 90 allows a user to readily and easily grab the projection 90 to twist the cap 48 onto and off of the drain fitting 42 disposed within or near the opening 28 of the vacuum tank 25. The cap 48 further includes a cylindrical side wall 94 having a recess and a threaded portion that engages the threaded portion 59 of the drain fitting 42 when the drain system 40 is in a closed position (FIG. 1).

The cap 48 further includes a cap insert 92 disposed within the recess of the side wall 94. The cap insert 92 includes a top portion 93 having a top surface 93a and a bottom surface 93b and a cylindrical side wall 95 that contacts the cylindrical side wall 94 of the cap 42 upon insertion into the cap 42. In other words, the cap insert 92 may be press fit into the recess of the cap 42, allowing exterior surfaces of the cylindrical side wall 95 of the cap insert 92 to directly contact interior surfaces of the cylindrical side wall 94 of the cap 42.

As further illustrated in FIG. 6, the cap insert 92 further includes a tab 96 extending from the top surface 93a and an interior projection 97 extending from the bottom surface 93b. The interior projection 97 is threaded to receive a fastener 98, which is adapted to removably mount or secure the interior projection 97 of the cap 42 to the channel 84 of the drain tube 46. The fastener 98 may include a truss screw that engages threads on the interior portion of the projection 97 or a snap that is press fit into the projection 97 to mount the same to the channel 84, for example. As one of skill in the art will appreciate, the fastener 98 is not limited to either a truss screw or a snap, but may alternatively include any other fastening structure capable of mounting or securing the projection 97 of the cap 48 to the channel 84 of the drain tube 46 and still fall within the scope of the present disclosure.

The tab 96 extending from the top surface 93a of the cap insert 92 aligns and fits within an interior portion of the grip 90. More specifically, in one example, the tab 96 is rectangular in shape (FIG. 5) or more generally, the tab 96 matches the shape of the grip 90, such that the tab 96 fits within the grip 90, further securing and holding the tab 96 and, thus, the cap insert 92 to the cap 48.

While not illustrated in FIG. 5 or 6, the exterior surface 70 of the drain tube 46 may include a plurality of grooves (FIG. 9), such as four grooves 71, each of which also extends along the length of the exterior surface 70. The plurality of grooves 71 are equally spaced about the exterior surface 70 or an outside circumference of the drain tube 46. In addition, each groove 71 of the four or plurality of grooves 71 is adapted to receive a corresponding drive rib 50 of a plurality of drive ribs of the drain fitting 42 upon insertion of the drain tube 46 into the drain fitting 42 to prevent rotation of the drain tube 46 during movement. In other words, while not illustrated in FIG. 5, for example, the interior surface 52 of the drain fitting 42 may include more than one drive rib 50, such as four drive ribs 50, that are equally spaced about the interior surface 52, such that each drive rib 50 fits into a corresponding groove 71. Such mating configuration between the grooves 71 of the drain tube 46 and the drive ribs 50 of the drain fitting 42 prevents rotation of the drain tube 46 when the cap 48 is removed from the drain fitting 42 to start draining the tank 22 and sliding movement of the drain tube 46 occurs.

Figure 7:
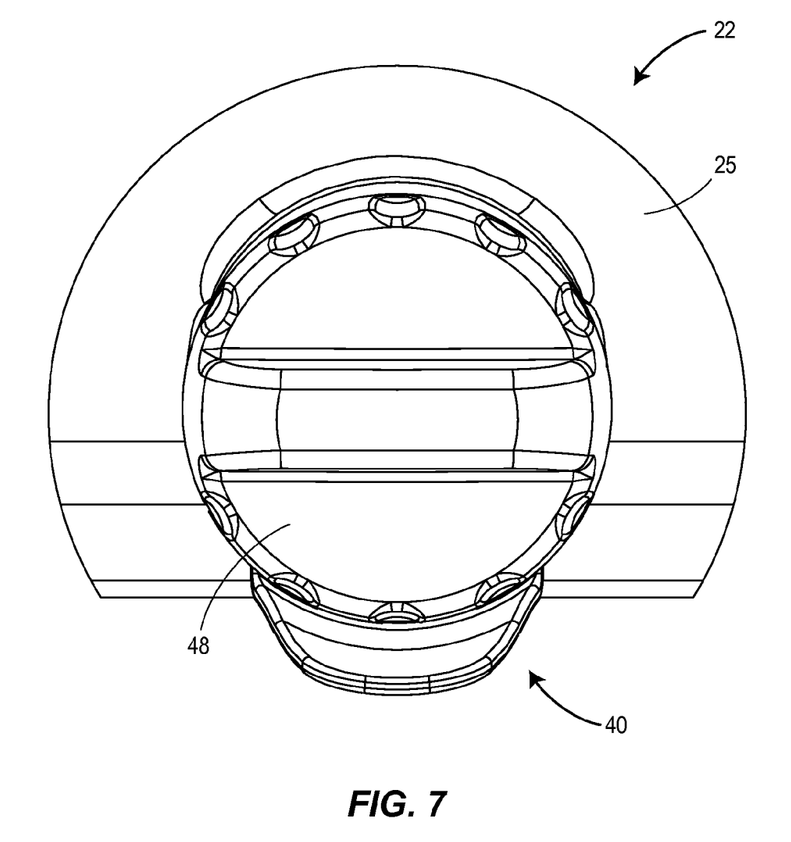
FIG. 7 is a front view the drain system of the present disclosure, the drain system in a closed position.
Figure 8:
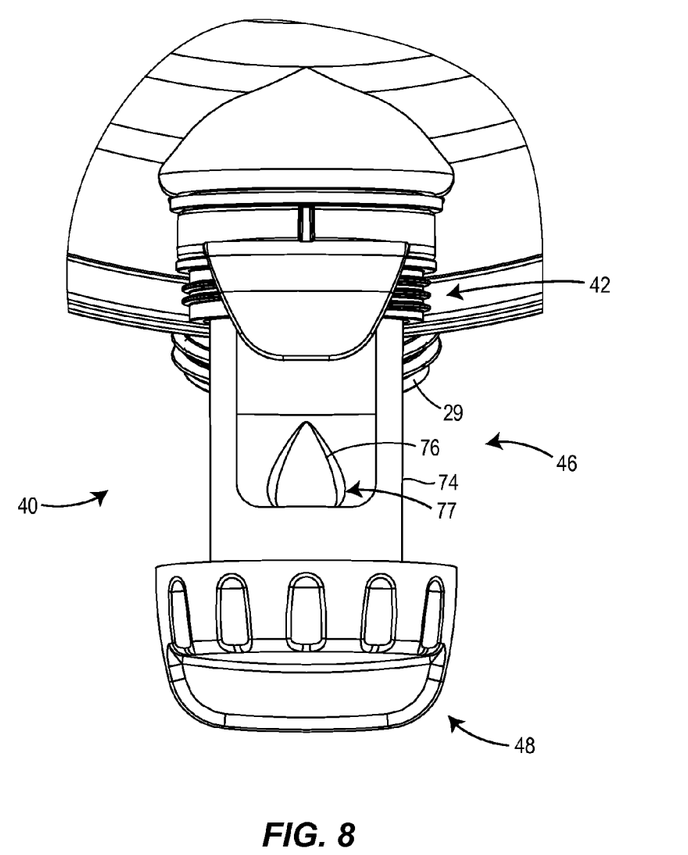
FIG. 8 is bottom perspective view of a portion of the drain system of the present disclosure, the drain system between a closed position and a fully open position.
Figure 9:
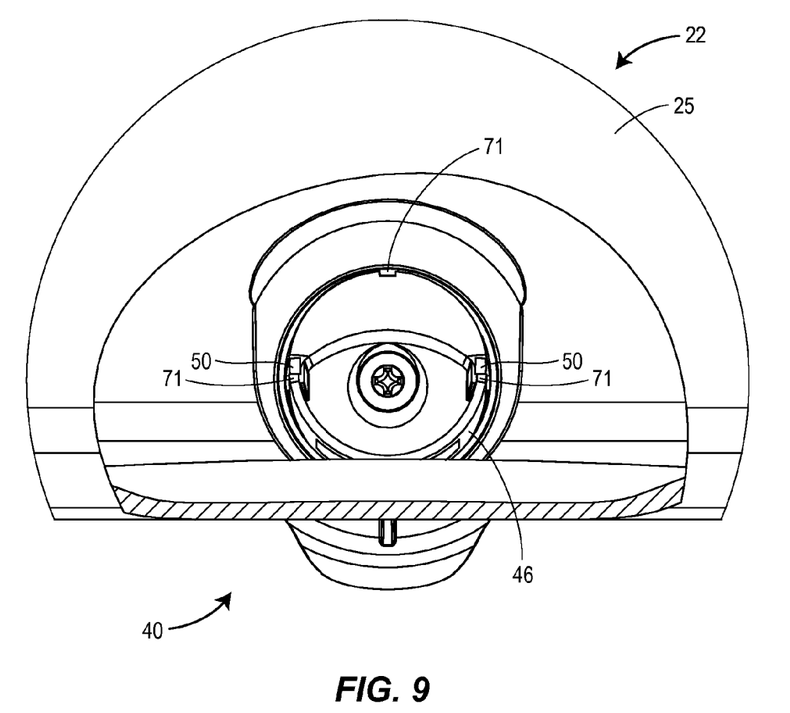
FIG. 9 is a cross-sectional view of the drain system of the present disclosure disposed within a drain fitting of the vacuum taken along the line B-B of FIG. 2.

Referring now to FIGS. 7-9, several views of the drain system 40 of the vacuum 20 are provided. More specifically, FIG. 7 illustrates a front view of the drain system 40 of the present disclosure disposed within the tank 22 of the vacuum 20, the drain system 40 in a closed position. FIG. 8 is a bottom perspective view of a portion of the vacuum 20 and drain system 40, illustrating another view of the outlet 77 disposed between the main diameter portion 74 and the reduced diameter portion 76 of the drain tube 46. The outlet 77 directs liquid and/or wet material from the tank 22 in the generally downward direction, for example, as explained in greater detail above. FIG. 9 is a cross-sectional view of a portion of the drain system 40 of the present disclosure disposed within the drain fitting 42 of the vacuum 20 taken along the lines B-B in FIG. 2. Three grooves 71 of the drain tube 46 are illustrated in an equally spaced configuration, as described above. Each of the grooves 71 is capable of receiving one of the drive ribs 50 of the drain fitting 42 to prevent rotation of the drain tube 46 during movement, as also explained in more detail above.

Thus, from the foregoing, it can be seen that the cap 48 is removably mounted to the drain tube 46. As a result of this configuration, and in general, longitudinal movement of the cap 48 in turn moves the drain tube 46 on which the cap 48 is mounted. The drain tube 46 is inserted into the opening 28 or the drain fitting 42 disposed within the opening 28 near the base 25 of the tank 22 of the vacuum cleaner 20. More specifically, at least one groove 71 of the train tube 46 receives at least one drive rib 50 of the opening 28 or drain fitting 42 upon insertion into opening 28 or the drain fitting 42. This allows the drain tube 46 to slide into and out of the opening 28 or drain fitting 42 along the at least one groove 71 of the drain tube 46, or in a direction parallel to a longitudinal axis of the drain tube 46, without any rotation of the drain tube 46. In other words, the drain tube 46 is capable of moving in and out of the opening 28 or drain fitting 42 in a direction parallel to the longitudinal axis of the drain tube 46, but is prevented from rotating.

To achieve a fully closed position of the drain system 40, the cap 48 is secured to the drain fitting 42, for example. More specifically, the threaded portion of the cylindrical sidewall 94 (FIG. 6) of the cap 48 engages the threaded portion 60 (FIG. 6) of the drain fitting 42. In other words, the cap 48 is removably secured to prevent material from exiting the tank 22 of the vacuum 20. When the cap 48 is in this position, the cap 48 is in a closed position.

When it is desired to move from the closed position to an open position to begin draining the tank 22 of the vacuum 20, the cap 48 is removed, e.g., unscrewed, from the drain fitting 42. This allows the drain tube 46 to which the cap 48 is mounted to move as well, e.g., slide out of the opening 28 in a first direction. However, while the cap 48 is rotated or unscrewed, for example, to remove the cap 48 from the drain fitting 42 and the drain tube 46 is moved, the drain tube 46 does not rotate. Instead, as explained, the drain tube 46 only moves or slides along the longitudinal axis of the drain tube 46 and in a direction parallel to the longitudinal axis of the drain tube 46. This helps allow the tank material, such as any one or more of liquid or other liquid based matter, to be directed in a generally downward direction by the angled step 78 of the drain tube 46 through the outlet 77, resulting in a controlled and efficient draining of the tank 22.

Figure 10A:
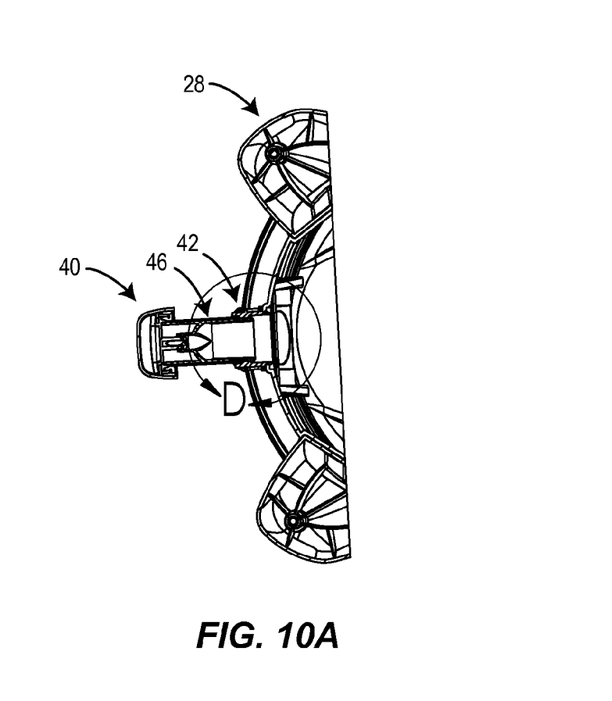
FIG. 10a is a top, cross-sectional view of the drain system of the present disclosure disposed within the drain fitting taken along the line C-C of FIG. 3.
Figure 10B:
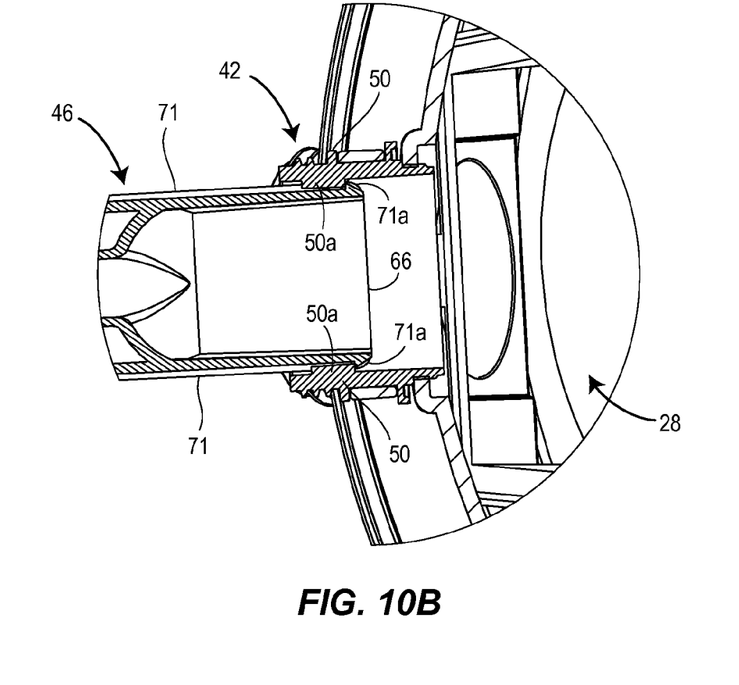

Referring now to FIGS. 10a and 10b, a top cross-sectional view and a close-up view of a portion D of the drain tube 46 secured to the drain fitting 42 are depicted. As illustrated in FIG. 10b, each groove 71 includes at least one tab 71a disposed at the first end 66 of the drain tube 46. Each tab 71a extends in a radially outward direction from a surface 70 of the groove 71. The tabs 71a snag or contact ribs 50a of the top and bottom drive ribs 50, as indicated in FIG. 10b, preventing the drain tube 46 from sliding all the way out of the tank 28 during operation of the drain system 40. In other words, the interaction between the tabs 71a of the grooves 71 and the drive ribs 50 prevent the drain tube from being pulled all the way out of the drain fitting 42 or pushed all the way out by water pressure during operation of the drain system 40. In addition, when the drain tube 46 moves from the closed position to the open position, the drain fitting 42 gives the drain tube 46 a tighter fit the more the drain tube 46 is pulled out of the drain fitting 42. Thus, the increasingly tighter fit between the drain tube 46 and the drain fitting 42 as the drain tube 46 is moved from the closed position to the open position also prevents the drain tube 46 from sliding all the way out of the tank 28 during operation of the drain system 40.

When it is desired to remove the drain tube 46 from the drain fitting 42, for example, the fastener 98 (FIG. 6) is first removed from the cap 42 from inside the tank 28, and the cap 42 is then able to be disconnected from the drain tube 46. Thereafter, the drain tube 46 is able to slide into the inside of the tank 28, allowing removal of the drain tube 46 from the drain fitting 42.

While various embodiments have been described herein, it is understood that the appended claims are not intended to be limited thereto, and may include variations that are still within the literal or equivalent scope of the claims.

What is claimed is:

1. A vacuum cleaner comprising:
  a tank for collecting material having a base, an outside surface and an opening disposed near the base;
  a drain system disposed adjacent the opening and including a drain tube having an outlet and a cap mounted to the drain tube and removably secured to prevent material from exiting the drain system, the drain system further comprising a drain fitting disposed within the opening of the tank and secured to the tank, the drain fitting further including an inside surface and an outside surface, wherein a drive rib is disposed on the inside surface;

wherein, when the cap is removed, the drain tube slides out of the opening in a first direction, and the outlet permits material to leave the drain tube in a direction other than the first direction.

2. The vacuum cleaner of claim 1, wherein the outside surface includes a cylindrical portion having a flange extending radially therefrom and a threaded portion, such that the cylindrical portion is disposed within the opening of the tank.

3. The vacuum cleaner of claim 1, the drain tube further comprising a cylindrical body having an exterior surface with at least one groove for receiving the drive rib of the drain fitting upon insertion of the drain tube into the drain fitting.

4. The vacuum cleaner of claim 3, wherein the inside surface of the drain fitting includes a plurality of drive ribs equally spaced along a circumference of the drain fitting, and the exterior surface of the drain tube includes a plurality of grooves that are also equally spaced along a circumference of the drain tube, such that each of the drive ribs fit within each of the grooves to prevent rotation of the drain tube during movement.

5. The vacuum cleaner of claim 1, the drain tube further comprising a reduced diameter portion disposed near the drain fitting, a main diameter portion disposed near the cap and an angled step disposed between the reduced diameter portion and the main diameter portion for directing material through the outlet of the drain tube.

6. The vacuum cleaner of claim 1, wherein the drain fitting includes a threaded portion and the cap includes a cylindrical sidewall having a threaded portion that engages the threaded portion of the drain fitting to removably secure the cap to the drain fitting when the drain system is in a closed position.

7. The vacuum cleaner of claim 1, the drain tube further comprising an interior surface having a flange radially extending therefrom and a channel extending from an end portion of the flange, the channel disposed in a central area of the drain tube and adapted to receive a portion of the cap to help secure the cap to the drain tube.

8. The vacuum cleaner of claim 7, the cap further comprising an exterior surface having a grip extending therefrom, a cylindrical side wall having a recess, and a cap insert disposed within the recess.

9. The vacuum cleaner of claim 8, wherein the cap insert includes a top portion having a top surface and a bottom surface, a tab extending from the top surface and a projection extending from the bottom surface, the projection having an interior portion with threads for receiving a fastener that removably secures the cap to the channel of the drain tube.

10. The vacuum cleaner of claim 9, wherein the fastener comprises one of a truss screw, a snap or other structure capable of securing the cap to the channel of the drain tube.

11. A drain system for a wet/dry vacuum, the wet/dry vacuum having a base and an opening disposed near the base, the drain system comprising:
a drain tube having an outlet and a longitudinal axis; and
a cap mounted to the drain tube and removably secured to prevent material from exiting the drain system;
wherein, upon removal of the cap, the drain tube slides out of the opening in a first direction, and the outlet permits material to leave the drain tube in a direction other than a first direction, and wherein the direction other than a first direction includes a generally downward direction.

12. The drain system of claim 11, the drain tube further comprising a cylindrical body, a first end having a spherical radius, a second end, an exterior surface extending along the length of the tube between the first and second ends, a main diameter portion disposed near the second end of the pair of ends, and a reduced diameter portion disposed near the first end, wherein the outlet is disposed between the main diameter portion and the reduced diameter portion.

13. The drain system of claim 11, the drain system further comprises a drain fitting disposed within the opening and secured to the tank, the drain fitting having a drive rib.

14. The drain system of claim 13, wherein the exterior surface of the drain tube includes at least one groove extending along the length of the exterior surface, wherein each groove is adapted to receive the drive rib to prevent rotation of the drain tube.

15. The drain system of claim 11, the cap further comprising an exterior surface having a grip extending therefrom, a cylindrical side wall having a recess, and a cap insert disposed within the recess.

16. The drain system of claim 15, wherein the cap insert includes a top portion having a top surface and a bottom surface, a tab extending from the top surface and a channel extending from the bottom surface, the channel having an interior portion with threads for receiving a fastener that removably secures the cap to the drain tube.

17. A method of draining a tank of a wet/dry vacuum comprising:
mounting a cap to a drain tube having an outlet;
inserting the drain tube into an opening disposed near a base of a wet/dry vacuum tank;
removably securing the cap to prevent material from exiting the drain tube;
removing the cap, to allow the drain tube to slide out of the opening in a first direction;
permitting material to leave the drain tube via the outlet in a direction other than the first direction; and
preventing rotational movement of the drain tube when the drain tube slides out of the opening in the first direction, wherein preventing rotational movement of the drain tube comprises inserting a drive rib into a groove disposed on the drain tube, allowing the drain tube to slide out of the opening without rotation.

18. The method of claim 17, wherein removably securing the cap comprises engaging a threaded portion of a cylindrical sidewall of the cap to a threaded portion of a drain fitting disposed in the opening of the tank.

19. The method of claim 18, wherein permitting material to leave the tank in a direction other than the first direction comprises forming an angled step between a main diameter portion and a reduced diameter portion of the drain tube, and guiding material via the angled step to the outlet of the drain tube.

20. A drain system for a wet/dry vacuum, the wet/dry vacuum having a base and an opening disposed near the base, the drain system comprising:
a drain tube having an outlet;
a cap mounted to the drain tube and removably secured to prevent material from exiting the drain system; and
a drain fitting disposed within the opening and secured to the tank, the drain fitting having a drive rib,
wherein, upon removal of the cap, the drain tube slides out of the opening in a first direction, and the outlet permits material to leave the drain tube in a direction other than a first direction.

* * * * *